United States Patent Office 3,301,866
Patented Jan. 31, 1967

3,301,866
SUBSTITUTED INDENOPYRIDINES
Marshall D. Draper, Woodland Hills, Calif., assignor to Rexall Drug and Chemical Company, Los Angeles, Calif., a corporation of Delaware
No Drawing. Filed Aug. 12, 1965, Ser. No. 479,335
6 Claims. (Cl. 260—294.7)

This application is a continuation-in-part of my application entitled, "Substituted Indenopyridines and Processes of Making and Using the Same," Serial No. 432,425, filed February 12, 1965, now abandoned.

This invention relates to compositions of matter classified in the art of chemistry as substituted indenopyridines and to processes pertaining thereto.

The invention sought to be patented in its product composition aspect is described as residing in the concept of a chemical compound having a molecular structure in which the 9-oxo-1,2,3,4,4a9a-hexahydro-9H-indeno[2,1-c]pyridine nucleus bears at the 2-position a lower alkyl or lower cycloalkyl radical and at the 4a-position a phenyl radical, and the hereinafter described equivalent thereof.

The invention sought to be patented, in its process of making aspect, is described as residing in the concept of a chemical process comprising the treatment of an N-lower alkyl- or N-lower cycloalkyl substituted-3-oxo-1-phenyl-1-indanethylamine with formaldehyde in an acid medium thereby to form the tangible embodiments of this invention in its product composition aspect.

The invention sought to be patented, in its process of use aspect, is described as residing in the concept of a chemical process comprising the removal of the oxo radical at the 9-position of a 2-lower alkyl- or 2-lower cycloalkyl-9-oxo-4a - phenyl-1,2,3,4,4a,9a, - hexahydro-9H-indeno[2,1-c]pyridine by treatment with hydrazine and an alkali metal lower-alkoxide or hydroxide.

As used throughout the specification and/or in the claims, the term "lower alkyl" embraces straight and branched chain alkyl radicals containing 1 to 6 carbon atoms, for example methyl, ethyl, isopropyl, sec-butyl, tert-butyl, n-amyl, n-hexyl, 2-ethylbutyl and the like; the term "lower cycloalkyl" embraces cycloalkyl or lower alkyl substituted cycloalkyl radicals containing from 3 to 9 carbon atoms, for example cyclopropyl, cyclobutyl, cyclopentyl, cyclohexyl, cycloheptyl, cyclooctyl, cyclononyl, methylcyclopentyl, ethylcyclohexyl and the like; the term "lower alkoxy" embraces straight and branched chain alkoxy radicals containing 1 to 6 carbon atoms, for example methoxy, ethoxy, isopropoxy, tert-butoxy, n-hexyloxy, 2-ethylbutoxy and the like; the term "halo" embraces fluoro, chloro, bromo and iodo; and the term "alkali metal" embraces lithium, potassium and sodium.

The tangible embodiments of this invention possess the inherent general physical properties of being, in the form of their acid addition salts, solid crystalline materials. Infrared spectral data and elemental analysis, taken together with the nature of the starting materials and mode of synthesis, positively confirm the structure of the compounds sought to be patented.

The tangible embodiments of this invention possess the inherent applied use characteristics of having pharmacological activity as central nervous system depressant agents without adverse toxicity as determined by recognized and accepted pharmacological test procedures. In addition, the tangible embodiments of this invention possess utility as chemical intermediates in accordance with the process of use aspect of this invention.

The manner and process of making and using the invention will now be generally described so as to enable a person skilled in the art of chemistry to make and use the same as follows:

The starting material for the preparation of the tangible embodiments of this invention are N-lower alkyl- or N-lower cycloalkyl-3-oxo-1-phenyl-1-indanethylamines which are prepared from 3-oxo-1-phenyl-1-indanacetic acid, C. F. Koelsch, J. Org. Chem., 25, 2088–91 (1960), by treatment with thionyl chloride and a lower alkylamine or lower cycloalkylamine to form an N-lower alkyl- or N-lower cycloalkyl-3-oxo-1-phenyl-1-indanacetamide, treatment of the amide with lithium aluminum hydride to form a mixture of 3-oxo- and 3-hydroxy derivatives of N-lower alkyl- or N-lower cycloalkyl-1-phenyl-1-indanethylamine and treatment of this mixture with chromium trioxide and sulfuric acid (Jones Reagent) to form the starting materials which are described and claimed in my application 479,273, filed August 12, 1965, entitled "Substituted 3-Oxoindans."

The conversion of the starting materials to the tangible embodiments of this invention is carried out as illustrated in the following reaction sequence:

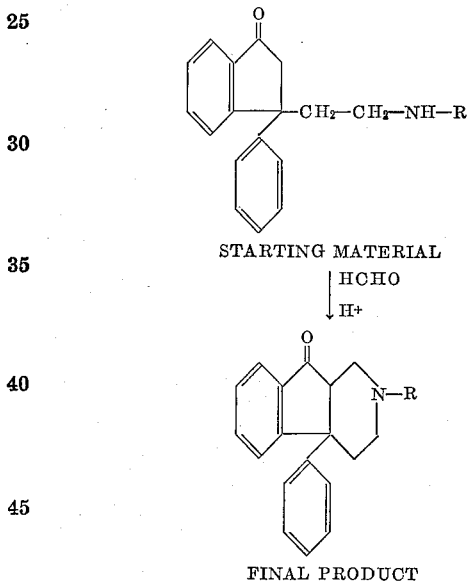

FINAL PRODUCT wherein R is lower alkyl or lower cycloalkyl.

According to the reaction sequence depicted above, the starting material is converted to the tangible embodiments of this invention by treatment with formaldehyde, or its equivalents such as paraformaldehyde and other lower aliphatic aldehydes such as acetaldehyde, at reflux temperature in an acidic inert solvent reaction medium. Useful inert solvents include tetrahydrofuran, ethanol and mixtures thereof. Acidic conditions are maintained by the presence of a mineral acid such as hydrochloric acid, sulfuric acid and the like or a carboxylic acid such as oxalic acid. The desired degree of acidity can be maintained by use of an acid salt of the starting material in the reaction mixture. The product is recovered by conventional techniques of crystallization.

Starting materials wherein either or both benzene rings bear one or more lower alkyl, hydroxy, lower alkoxy, trifluoromethyl or halo substituents are prepared by the same techniques set forth hereinabove and in my copending application 479,273, filed August 12, 1965, entitled "Substituted 3-Oxoindans," and are the full equivalents to the specific starting materials depicted hereinabove in the above-described reaction sequence. Their use results in the preparation of final products having alkyl, hydroxy, alkoxy, trifluoromethyl or halo substitution on the benzene rings at the same place as in the starting materials, such products having the same utility as the specific products depicted in the above reaction sequence.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and polybasic acids, such as the citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

In accordance with the process of use aspect of this invention the 9-oxo radical of the tangible embodiments of this invention is removed by a two step process comprising, first, refluxing with hydrazine to form the corresponding hydrazone followed by refluxing the hydrazone with an alkali metal hydroxide or alkali metal loweralkoxide, such as potassium ethoxide, sodium isopropoxide, potassium t-butoxide and the like in the presence of an inert solvent such as toluene, xylene and the like. The deoxygenated product is recovered by conventional techniques.

The best mode contemplated by the inventor for carrying out his invention will now be set forth as follows:

*Example 1.—2-methyl-9-oxo-4a-phenyl-1,2,3,4,4a,9a-hexahydro-9H-indeno[2,1-c]pyridine*

N - methyl - 3 - oxo - 1 - phenyl - 1 - indanethylamine oxalate (7.7 g., 0.0218 mole) is suspended in a mixture of tetrahydrofuran (390 ml.) and absolute ethanol (390 ml.). Paraformaldehyde (3 g.) is added and the mixture is refluxed for 18 hours. The clear solution is evaporated to dryness in vacuo and the residue crystallized from methanolethyl acetate to yield 7.2 g. (90%) of product, M.P. 213–214° C.

*Analysis.*—Calculated for $C_{19}H_{19}NO \cdot C_2H_2O_4$: C, 68.65%; H, 5.76%; N, 3.82%; O, 21.78%. Found: C, 68.57%; H, 5.84%; N, 4.01%; O, 21.79%.

The following examples illustrate the preparation of other tangible embodiments of this invention:

*Example 2.—2-propyl-9-oxo-4a-phenyl-1,2,3,4,4a,9a-hexahydro-9H-indeno[2,1-c]pyridine*

N - propyl - 3 - oxo - 1 - phenyl - 1 - indanethylamine oxalate (4.57 g., 0.012 mole) is dissolved in hot methanol (125 ml.) and tetrahydrofuran (125 ml.). Paraformaldehyde (2.3 g. is added and the mixture is refluxed for 18 hours. The mixture is then cooled, filtered and the solvent removed under reduced pressure. The residue is converted to the free base by treatment with ammonium hydroxide and then extracted with ether. The extract is washed and dried and the solvent removed by evaporation to yield 3.35 g. of an oil. The product is recovered in the form of its oxalate salt, M.P. 170° C.

*Analysis.*—Calculated for $C_{21}H_{23}NO \cdot \frac{1}{2}H_2O$: C, 68.29%; H, 6.47%; N, 3.46%; O, 21.73%. Found: C, 68.47%; H, 6.54%; N, 3.47%; O, 21.13%.

*Example 3.—2-cyclopropyl-9-oxo-4a-phenyl-1,2,3,4,4a,9a-hexahydro-9H-indeno[2,1-c]pyridine*

N-cyclopropyl-3-oxo-1-phenyl - 1 - indanethylamine oxalate (8.3 g., 0.022 mole) is dissolved in a mixture of methanol (200 ml.) and tetrahydrofuran (200 ml.) and paraformaldehyde (3.0 g., 0.1 mole) added. The mixture is refluxed for 18 hours, then cooled and filtered and contrated under reduced pressure. The residue is converted to the free base by treatment with ammonium hydroxide and then extracted with ether to yield 5.3 g. (84%) of product in the form of an oil that is converted to the picrate salt (M.P. 182–183° C.) for characterization.

*Analysis.*—Calculated for $C_{27}H_{24}N_4O_8$: C, 60.91%; H, 4.54%; N, 10.54%; O, 24.04%. Found: C, 60.72%; H, 4.90%; N, 10.73%; O, 24.10%.

*Example 4.—6-methoxy-2-methyl-9-oxo-4a-phenyl-1,2,3,4,4a,9a-hexahydro-9H-indeno[2,1-c]pyridine*

6-methoxy-N-methyl-1-phenyl-1-indanethylamine oxalate (5.4 g., 0.014 mole) is dissolved in a mixture of absolute ethanol (250 ml.) and tetrahydrofuran (250 ml.) and paraformaldehyde (4.0 g.) is added. The mixture is refluxed for 18 hours, cooled and filtered and the solvent removed under reduced pressure. The residue is dissolved in water and the solution made basic to form the free base which is extracted with ether. After washing and drying the extract, the ether is removed under reduced pressure to yield 4.2 g. of product in the form of an oil that is characterized as the picrate salt, M.P. 200–200.5° C.

*Analysis.*—Calculated for $C_{26}H_{24}N_4O_9$: C, 58.21%; H, 4.51%; N, 10.44%; O, 26.84%. Found: C, 57.85%; H, 4.48%; N, 10.21%; O, 27.07%.

The following example is illustrative of the process of use aspect of this invention:

*Example 5*

A quantity of 230 mg. (63 m. mole) of the compound prepared as described in Example 1 is refluxed for 18 hours in 10 ml. anhydrous hydrazine. Excess hydrazine is removed under reduced pressure, the residue is dried for one hour at 50° C. at 1 mm. of mercury, and is then suspended in a mixture of 200 mg. potassium t-butoxide and 20 ml. toluene and refluxed for 18 hours. Toluene is removed under reduced pressure, 15 ml. water added and the mixture is extracted with ether. The extract is washed with water, dried over anhydrous Mg $SO_4$ and evaporated to dryness under pressure.

The resulting orange colored oil is chromatographed with chloroform over acid wash alumina. Material coming from the column is discarded until substantially colorless. The colorless fractions are combined and the product isolated as the picrate salt of 2-methyl-4a-phenyl-1,2,3,4,4a,9a-hexahydro - 9H - indeno[2,1 - c]pyridine, the compound which is described and claimed in my application 479,290 filed August 12, 1965, entitled "Substituted Indenopyridines."

The subject matter which the applicant regards as his invention is particularly pointed out and distinctly claimed as follows:

I claim:

1. 2-lower alkyl-9-oxo-4a-phenyl-1,2,3,4,4a,9a-hexahydro-9H-indeno[2,1-c]pyridine.

2. 2 - methyl-9-oxo-4a-phenyl-1,2,3,4,4a,9a-hexahydro-9H-indeno[2,1-c]pyridine.

3. 2 - propyl-9-oxo-4a-phenyl-1,2,3,4,4a,9a-hexahydro-9H-indeno[2,1-c]pyridine.

4. 6-methoxy-2 - methyl-9-oxo-4a-phenyl-1,2,3,4,4a,9a-hexahydro-9H-indeno[2,1-c]pyridine.

5. 2 - lower cycloalkyl - 9-oxo-4a-phenyl-1,2,3,4,4a,9a-hexahydro-9H-indeno[2,1-c]pyridine.

6. 2 - cyclopropyl - 9-oxo-4a-phenyl-1,2,3,4,4a,9a-hexahydro-9H-indeno[2,1-c]pyridine.

References Cited by the Examiner

UNITED STATES PATENTS 2,546,652  3/1951  Plati et al. _____ 260—297

OTHER REFERENCES

Auslegeschrift, 1,085,882, July 1960, German (Rossi et al.).

JOHN D. RANDOLPH, *Primary Examiner.*

WALTER A. MODANCE, A. D. SPEVACK, *Assistant Examiners.*